United States Patent
Michalk et al.

(10) Patent No.: US 9,023,169 B2
(45) Date of Patent: May 5, 2015

(54) FUNCTIONAL LAMINATE

(75) Inventors: Manfred Michalk, Erfurt (DE); Franziska Hofmann, Schlossvippach (DE); Andreas Griesbach, Erfurt (DE)

(73) Assignee: Hid Global GmbH (DE)

( * ) Notice: Subject to any disclaimer, the term of this patent is extended or adjusted under 35 U.S.C. 154(b) by 541 days.

(21) Appl. No.: 12/435,988

(22) Filed: May 5, 2009

(65) Prior Publication Data
US 2009/0291271 A1 Nov. 26, 2009

(30) Foreign Application Priority Data

May 6, 2008 (EP) .................................... 08155721

(51) Int. Cl.
| | | |
|---|---|---|
| *B32B 38/00* | (2006.01) | |
| *B32B 38/04* | (2006.01) | |
| *B29C 65/02* | (2006.01) | |
| *B32B 27/08* | (2006.01) | |
| *B32B 3/18* | (2006.01) | |
| *B32B 27/36* | (2006.01) | |
| *B32B 27/40* | (2006.01) | |

(52) U.S. Cl.
CPC . *B32B 27/08* (2013.01); *B32B 3/18* (2013.01); *B32B 27/36* (2013.01); *B32B 27/40* (2013.01)

(58) Field of Classification Search
CPC ............ B32B 3/10; B32B 3/18; B32B 27/08; B32B 27/40
USPC ................... 156/250, 252, 253, 256
See application file for complete search history.

(56) References Cited

U.S. PATENT DOCUMENTS

| | | | |
|---|---|---|---|
| 5,084,345 A * | 1/1992 | Manos | ........................ 428/335 |
| 5,217,794 A | 6/1993 | Schrenk | |
| 2003/0052177 A1 | 3/2003 | Halope | |
| 2004/0182939 A1 | 9/2004 | Furst et al. | |
| 2007/0062629 A1 | 3/2007 | Monteilliet | |

FOREIGN PATENT DOCUMENTS

| | | |
|---|---|---|
| DE | 19710656 | 9/1998 |
| EP | 1502765 | 2/2005 |
| EP | 1574359 | 9/2005 |
| WO | WO 2007/089140 | 8/2007 |

OTHER PUBLICATIONS

Machine Translation of DE19719656, Sep. 17, 1998.*
Written Opinion for European Application No. PCT/EP2009/055381, mailed Sep. 21, 2009.
International Search Report for European Application No. PCT/EP2009/055381, mailed Sep. 21, 2009.

* cited by examiner

*Primary Examiner* — Mark A Osele
*Assistant Examiner* — Christopher C Caillouet
(74) *Attorney, Agent, or Firm* — Sheridan Ross P.C.

(57) ABSTRACT

The invention refers to a method for manufacturing such a functional laminate, the method comprising the following steps: providing at least one patchwork layer; stacking the patchwork layer with at least one other layer in order to obtain a stack of layers, wherein at least one proximate layer directly adjacent to the patchwork layer comprises at least one zone comprising a first material or a second material; laminating the stack of layers together by heat and/or pressure and/or gluing.

9 Claims, 3 Drawing Sheets

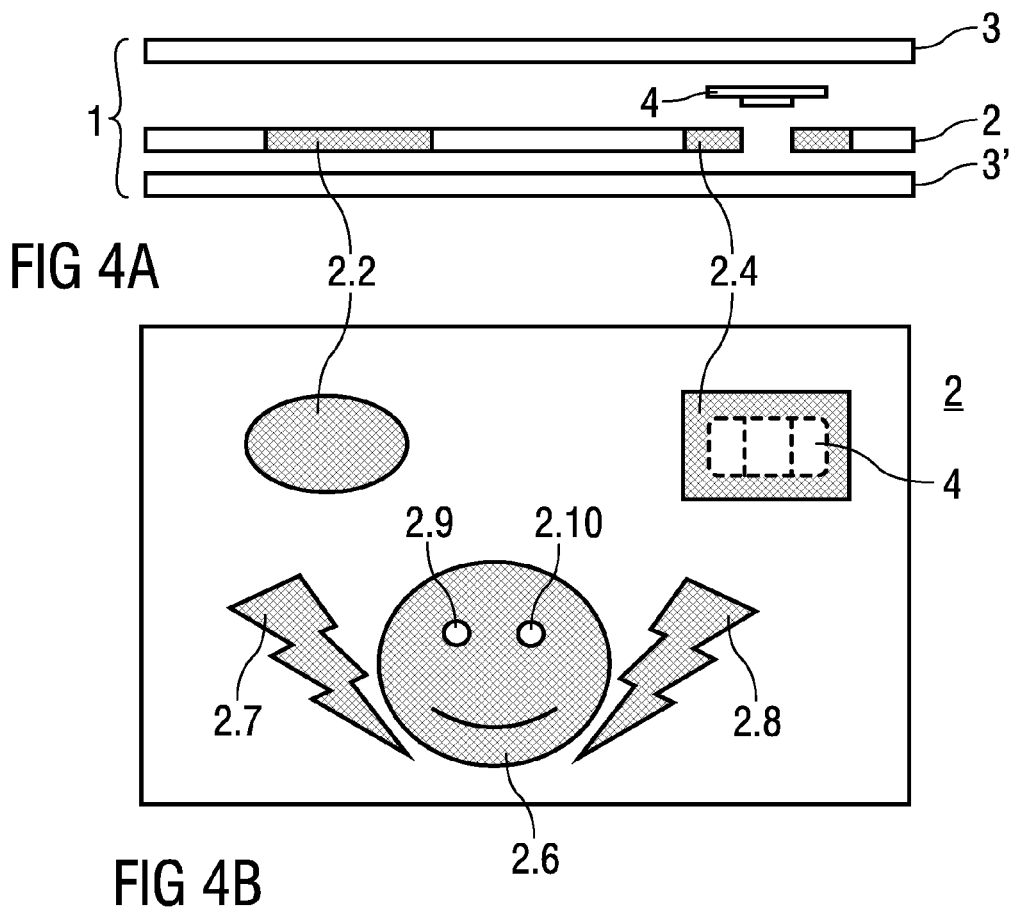
FIG 4A
FIG 4B
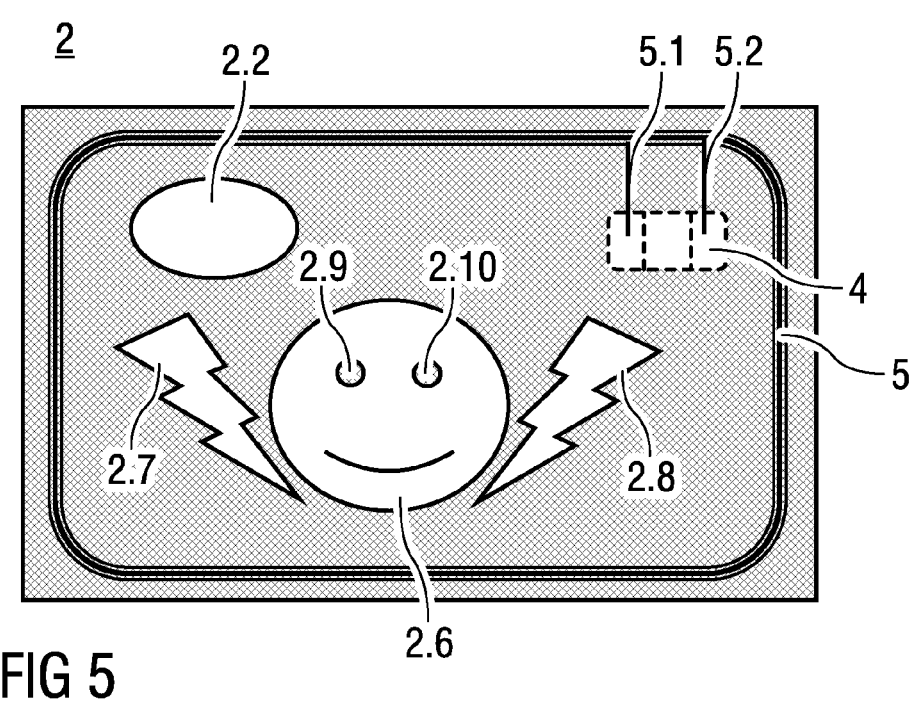
FIG 5

FUNCTIONAL LAMINATE

CROSS-REFERENCE TO RELATED APPLICATIONS

This Application claims the benefit of European Patent Application No. 08155721.7 filed on May 6, 2008, the entire disclosure of which is hereby incorporated herein by reference.

FIELD OF THE INVENTION

The invention refers to a functional laminate. Functional laminates are documents resulting from the lamination of a plurality of layers. In particular they are used as security documents such as smart cards, ID cards, credit cards and the like.

BACKGROUND

Functional laminates also refer to semi-finished products like prelaminates or inlays, which are used for example for the manufacturing of smart cards equipped with chips or chip modules, RFID antennae and the like. They usually consist of a number of core layers and two or more cover layers covering the core layers, wherein the chip module is embedded in the layers. The layers usually consist of a plastic material such as polycarbonate or polyethylene terephthalate.

In DE 197 10 656 A1 a smart card is disclosed, wherein layers have recesses to accommodate components such as an antenna coil or a chip module or another semiconductor. The component is embedded with a filler in the stamped-out region. The filler is initially in fluid form. Excess filler is removed and the layers are laminated under heat and pressure.

In WO2007/089140 A1 an identity document is disclosed, consisting of a support and a chip accommodated therein. The support may be produced by laminating different layers, one or more of these layers being provided with an opening for accommodating the chip. Laminating or applying the plastic in another way takes place at a relatively high temperature. During cooling, the support and the chip exhibit different shrinking properties, resulting in stresses which may lead to cracks. It is proposed to provide an auxiliary layer between the layer directly adjoining the chip and the subsequent layer. This auxiliary layer consists of a rubber-like material having a thermal coefficient of expansion which is greater than that of the adjoining two layers.

In EP 1 502 765 A1 a method for producing a booklet, in particular an identity booklet is disclosed. The booklet comprises a cover, several leaves and at least one data page with a flexible layer. The layer is provided with means which further strengthen its joint with a data carrier. Such means may be recesses, in particular.

When the layers are laminated using heat and/or pressure the macromolecules of the plastic material tend to shorten thus causing the plastic material to shrink. Since the chip module itself does not shrink the material is subjected to mechanical stress eventually leading to deforming, cracking or delaminating the material thus limiting the service life of the smart card.

SUMMARY

It is accordingly an object of the invention to provide a functional laminate able to absorb mechanical stress caused by shrinkage of the cover layer in the laminating process. It is also an object of the invention to provide a method for producing such a functional laminate.

The object is achieved by a functional laminate according to claim 1 and by a method according to claim 14.

Additional embodiments of the invention are given in the dependent claims.

A functional laminate according to embodiments of the invention comprises at least two co-laminated layers. At least one of the layers is a patchwork layer consisting of zones of multiple types distinct from each other, i.e. there are at least one zone of a first type and one zone of a second type. The zones of the first type comprise a first material and the zones of the second type comprise a second material, distinct from the first material. The proximate layer or layers adjacent to the patchwork layer comprise at least one zone comprising the first or the second material. The first material may comprise a single substance or a combination of substances and the second material may comprise a single substance or a combination of substances, the substance or combinations of substances in the second material being different than the substance or combinations of substances in the first material (either in relative quantity or in the type of substances). However, the first and second materials may have some similar substances but not the exact same combination of substances. For example, the first material may comprise a combination of substance A and substance B while the second material may comprise a combination of substance B and substance C (or just substance B or just substance C). As another example, the first material may comprise a combination of substance A and substance B while the second material may comprise a combination of substance C and substance D.

Mechanical stress may be absorbed by the zones when the functional laminate is subjected to heat thus keeping the functional laminate from breaking or delaminating. Such a functional laminate may be used in smart cards leading to an increased service life.

Preferably, there may be more than one zone of each type in the patchwork layer.

In one embodiment at least one uninterrupted bridge of the first material or the second material is formed between two faces of the functional laminate through the zones of the patchwork layer or patchwork layers. The uninterrupted bridge exhibits the same material properties over its spread, in particular shrinking properties. When laminated under heat mechanical stress due to shrinking is absorbed by the uninterrupted bridges thus keeping the functional laminate from breaking or delaminating.

Preferably a portion of the uninterrupted bridges may be formed so as to form a vertical column with respect to a normal on a surface of the functional laminate, the vertical column extending through the entire functional laminate. The uninterrupted bridge may as well be formed with staggered zones in adjacent patchwork layers with respect to the normal on the functional laminate. Both embodiments may absorb mechanical stress due to shrinking.

Preferably the patchwork layer essentially consists of one of the first or second material and has at least one recess at least partially filled with a patch at least comprising the respective other of the first or second material, thus forming the zones. The patch may comprise only one layer or consist of a combination of a plurality of layers. Such a multilayer patch may be composed from different materials and result in a complex structure.

The zones of the patchwork layer may be arranged to form a security pattern. Such a security pattern or watermark may be used to produce a tamper-proof smart card. When a smart card with a security pattern is tampered with, e.g. by delaminating, replacing the chip module and re-laminating, at least some of the layers with the respective patches will inevitably be destroyed. Replacing them will result in a modified security pattern which reveals the tampering.

The first material as well as the second material may be plastic materials. Preferably the first material is more solid and resistant than the smoother second material.

A chip or chip module may be embedded in the smoother second material. When the first material shrinks due to heat while the chip module does not the smoother second material may absorb the resulting mechanical stress. The first material and/or the second material may be plastic materials. In particular, the first material may be polycarbonate (PC) or a polyethylene terephthalate (PET). The second material may be a thermoplastic polyurethane (TPU).

A chip or a chip module may be arranged in at least one of the zones of the patchwork layer, at least in the finished body after lamination. The chip module is preferably positioned on top of the patchwork layer before lamination, not embedded into it. It is embedded later in the lamination process. The positioning of the chip module may be eased by a small empty recess provided inside of the zone/patch of smoother material intended to embed the chip module during the lamination process. Furthermore such a small recess reduces the amount of material displaced from the patch by the chip module during the lamination process so a more homogenous thickness of the functional laminate may be achieved. This feature can keep the area surrounding the chip module from being deformed during lamination so the appearance of the resulting smart card is improved.

When a chip or chip module is included in the functional laminate one zone of the smoother material is used in this purpose. So in such case at least one additional zone of the smoother material (but this one without a chip or chip module) may preferably be provided in order to reinforce the laminate by creating additional material bridge(s).

The recesses may be cut, stamped or drilled out from the surrounding material. A patch may be inserted into a recess or poured into a recess or may otherwise be located in a recess by any method known to persons of skill in the art.

The lamination of the layers may be performed by pressure and/or heat and/or gluing.

Patches may also be supported by an auxiliary material such as a non woven fabric thus easing the placement of the patch. The auxiliary material may be soaked and embedded by the surrounding material in the lamination process. Another way for easing the placement of the patch in the respective recess is to attach it to an adjacent layer, e.g. the cover layer before stacking the layers in such a way that the recess is filled with the patch.

Further components such as an antenna coil may be embedded in the functional laminate. The antenna coil may be connected to the chip or chip module.

The functional laminate may be used as an inlay or a prelaminate for manufacturing a security document, such as a passport, an ID or a card.

The functional laminate may be manufactured using a method comprising the steps of:
  providing at least one patchwork layer;
  stacking the patchwork layer with at least one other layer in order to obtain a stack of layers, wherein at least the proximate layer or layers directly adjacent to the patchwork layer comprise at least one zone comprising the first or second material;
  laminating the stack of layers together by heat and/or pressure and/or gluing.

The patchwork layer may be produced by:
  creating at least one recess in a layer essentially consisting of one of the first or second material;
  at least partially filling at least one of said recesses with a patch at least comprising the other of the first or second material.

One aspect of the invention is to provide the patchwork layer as a unit that can be handled by itself. This is simplifying the stacking and positioning steps. In case a chip or chip module shall be included in the finished functional laminate, the chip module is positioned on top of the patchwork layer before the lamination procedure. It will then be embedded during the lamination procedure. By contrast to the prior art, the chip module is not embedded into the patchwork layer before lamination.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus, are not limitative of the present invention, and wherein:

FIG. 4a shows a longitudinal section of a functional laminate with three layers, one of them a patchwork layer situated between the other layers, the patchwork layer exhibiting patches arranged for forming a security pattern and having en embedded chip module, FIG. 4b shows a top view of the patchwork layer from FIG. 4a, FIG. 5 shows a top view of a patchwork layer exhibiting patches arranged for forming a security pattern, having en embedded chip module and an antenna coil connected to the chip module.

DETAILED DESCRIPTION

Figure 1:
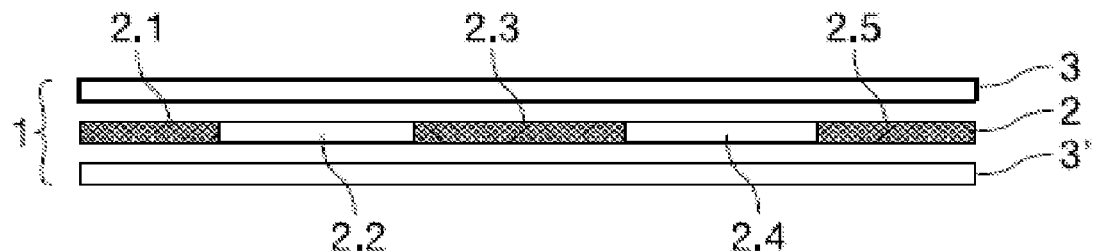
FIG. 1 shows a longitudinal section of a functional laminate with three layers, one of them a patchwork layer situated between the other layers.

FIG. 1 shows a longitudinal section of a functional laminate 1 before lamination with three layers 2, 3, 3'. The layer 2 situated between the other layers 3, 3' is a patchwork layer. The patchwork layer 2 consists of two different types of zones 2.1 to 2.5. The zones 2.2 and 2.4 of a first type consist of a first material while the zones 2.1, 2.3 and 2.4 of a second type consist of a second material. The other layers 3, 3' adjacent to the patchwork layer 2 consist of the first material. Uninterrupted bridges of the first material are formed by the zones 2.2, 2.4 between the layers 3, 3'.

In a concrete example, the layers 3 and 3' are made of polycarbonate, while the layer 2 essentially consists of a sheet of thermoplastic polyurethane (TPU) or a pure polyurethane (PU), with inserted patches of polycarbonate (represented by the zones 2.2 and 2.4 on the figure). After lamination this results in a functional laminate (for example a card) having external surfaces of polycarbonate and two internally uninterrupted bridges of polycarbonate, in order to reinforce the mechanical structure of the laminated body, in particular against de-lamination. The mechanical stress is absorbed by the zones of TPU or PU, being smoother than the polycarbonate, so crack formation is avoided.

Figure 2:
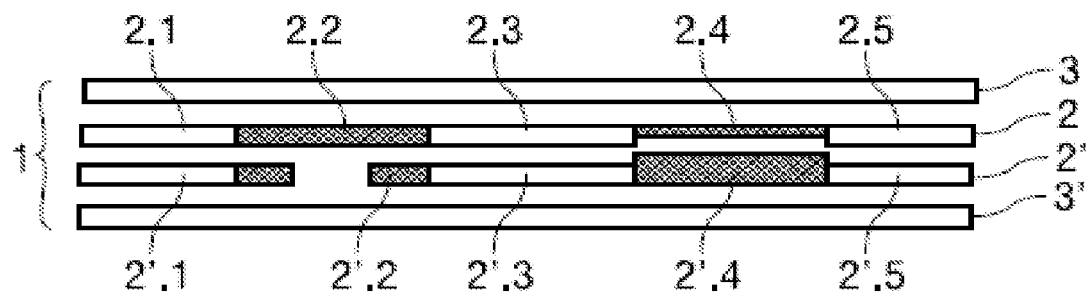
FIG. 2 shows a longitudinal section of another embodiment of the functional laminate with four layers, two of them being patchwork layers adjacent to each other and situated between the other layers.

FIG. 2 shows a longitudinal section of another embodiment of the functional laminate 1 with four layers 2, 2', 3, 3'. The layers 2 and 2' are designed as patchwork layers. The patchwork layers 2, 2' consist of two different types of zones 2.1 to 2.5, 2'.1 to 2'.5. The zones 2.1, 2.3, 2.5, 2'.1, 2'.3, 2'.5 consist of the first material while the zones 2.2, 2.4, 2'.2, 2'.4 consist of the second material. The other layers 3, 3' adjacent to the patchwork layers 2, 2' and enclosing them also consist of the first material. Uninterrupted bridges of the first material are formed by the zones 2.1, 2.3, 2.5, 2'.1, 2'.3, 2'.5 between the layers 3, 3'.

In a concrete example, all layers 2, 2', 3 and 3' are essentially made of polycarbonate. Layers 2 and 2' have inserted patches of TPU or PU (represented by the zones 2.2, 2'.2, 2.4 and 2'.4 on the figure). The functional laminate resulting from the lamination is apparently a mono bloc of polycarbonate having some discrete inner zones of TPU or PU. These zones of smoother material can be used to embed elements such as a chip module inside of the polycarbonate body without generating mechanical stress.

While the patch 2.2 entirely fills a recess in the surrounding first material of the layer 2, the patch 2'.2 only partially fills its recess. Furthermore it shows a smaller empty recess in its middle which may be used for accepting a chip or chip module, for example. The patch 2.4 only partially fills its recess by being thinner than the layer 2. This is compensated by the adjacent patch 2'.4 which is thicker than the layer 2'.

Figure 3:
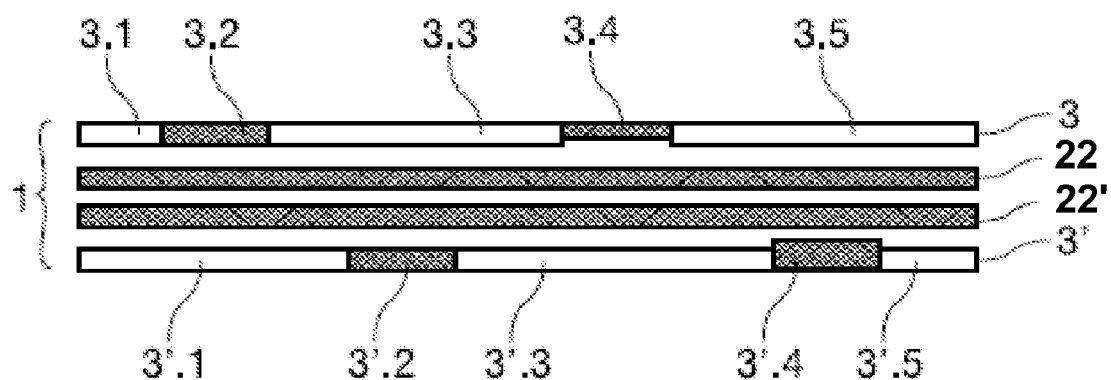
FIG. 3 shows a longitudinal section of another embodiment of the functional laminate with four layers, two of them being patchwork layers at a face of the functional laminate, enclosing the other layers.

FIG. 3 shows a longitudinal section of yet another embodiment of the functional laminate 1 with four layers 22, 22', 3, 3'. By contrast to FIG. 2, the cover layers 3 and 3' are designed as patchwork layers. The patchwork layers 3, 3' consist of two different types of zones 3.1 to 3.5, 3'.1 to 3'.5. The zones 3.1, 3.3, 3.5, 3'.1, 3'.3, 3'.5 of the first type consist of the first material while the zones 3.2, 3.4, 3'.2, 3'.4 of the second type consist of the second material. The other layers 22, 22' adjacent to each other and enclosed by the patchwork layers 3, 3' consist of the second material. Uninterrupted bridges of the second material are formed by the zones 3.2, 3'.2, 3.4, 3'.4 through the layers 22, 22'. By contrast to the FIGS. 1 and 2, where the uninterrupted bridges form vertical columns with respect to a normal an a surface of the functional laminate 1, the bridges in FIG. 3 are formed by the zones 3.2, 3'.2, 3.4, 3'.4, which are staggered with respect to that normal. The zone 3.4 only partially fills its recess by being thinner than the surrounding first material of the zones 3.3, 3.5. This is compensated by the zone 3'.4 of layer 3', which is thicker than the surrounding first material of the zones 3'.3, 3'.5. When laminating the stacked layers 22, 22', 3, 3' the excess material of zone 3'.4 will force the second material of the layers 22, 22' to fill the space left out by zone 3.4.

FIG. 4a shows a longitudinal section of another functional laminate 1 before lamination with three layers 2, 3, 3'. The layer 2 situated between the other layers 3, 3' is a patchwork layer. The patchwork layer 2 essentially consists of the first material with inserted patches 2.2 and 2.4 of the second material. The other layers 3, 3' enclosing the patchwork layer 2 consist of the first material. Uninterrupted bridges of the first material are formed everywhere but in the locations of the patches 2.2 and 2.4.

Figure 7:
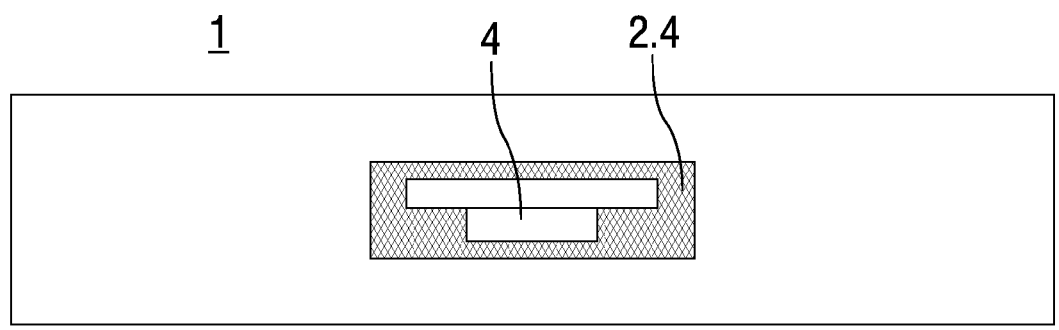
FIG. 7 shows a longitudinal section of a functional laminate with an embedded chip module.

In the alternative embodiment shown in this FIG. 4, a chip module 4, eventually connected to an antenna (not shown) to form a transponder, is also introduced in the stack of layers to be laminated. Preferably (but not necessary), the zone 2.4 comprises a recess in which the module 4 can be at least partially placed/held before the lamination process. During the lamination, the module is pressed into the material of the patch 2.4, which is then flowing around it. The ideal result is shown in FIG. 7, where the module is entirely surrounded by the material of the patch 2.4. The antenna connected to the module (not shown) is simply laminated and embedded between the layers 2 and 3. The first material can be for example polycarbonate while the second material is a TPU or PU. During and after the lamination, the mechanical stress due to the shrinking difference between the polycarbonate and the chip module will be absorbed by the smoother TPU or PU.

FIG. 4b shows a top view of the patchwork layer 2 from FIG. 4a. It can be seen that the layer 2 comprises three more inserted patches 2.6, 2.7 and 2.8 of the second material. Additionally, the patch 2.6 of the second material comprises also two patches 2.9 and 2.10 of the first material. The overall arrangement of the patches 2.2 to 2.10 in the layer 2 forms a security pattern helping to make the functional laminate 1 tamper-proof.

FIG. 5 shows an alternative configuration of the patchwork layer 2. By contrast to FIGS. 4a and 4b, the patchwork layer 2 essentially consists of the second material. Patches 2.2, 2.6, 2.7 and 2.8 of the first material are located in recesses of the layer 2. The patch 2.6 itself shows two recesses filled with two patches 2.9 and 2.10 of the second material. A transponder, comprising the chip module 4 connected to a wire antenna 5 by the wire ends 5.1 and 5.2, is placed over a homogenous patch-less zone of the layer 2 (this zone may optionally exhibit an empty recess to accept the chip module 4). After lamination, the chip module 4 and the antenna 5 are both embedded into the material of the layer 2.

Figure 6:
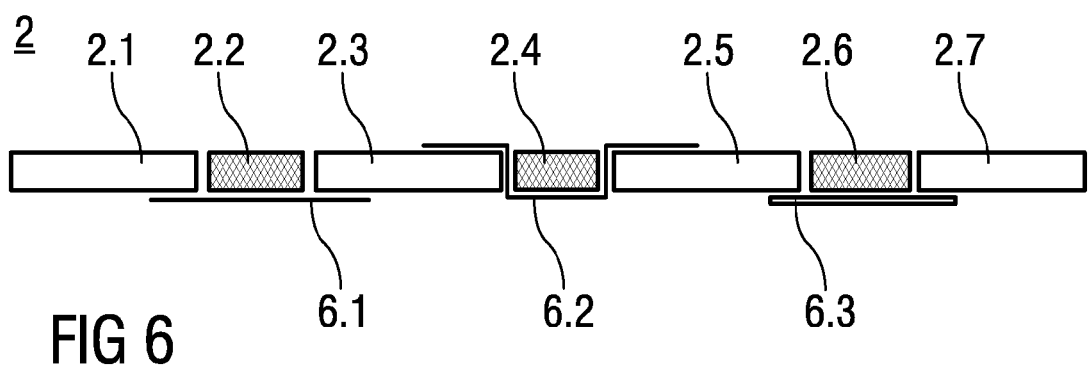
FIG. 6 shows a longitudinal section of a layer with patches supported by an auxiliary material.

FIG. 6 shows a longitudinal section of the patchwork layer 2 with examples of patches 2.2, 2.4, 2.6 of the second material located in recesses formed in the first material the layer 2 (illustrated by zones 2.1, 2.3, 2.5 and 2.7) is essentially formed of. In this embodiment, the patches are held in the recesses by different auxiliary sheets 6.1, 6.2 and 6.3. In the case of the auxiliary sheets 6.1 and 6.2 a non-woven fabric is used for easing/securing the placement of the patches 2.2 and 2.4. In the case of the auxiliary sheet 6.3 a thin layer of the first material is used. The auxiliary sheets 6.1 to 6.3 may be soaked and embedded by the surrounding material in the lamination process.

FIG. 7 shows a longitudinal section of another functional laminate 1 with an embedded chip module 4 in laminated state. The chip module 4 was arranged in a zone 2.4 (of the type shown in FIG. 4a) of the second material in a patchwork layer essentially consisting of the first material and enclosed by layers having the same first material at least in the region shown in FIG. 7.

The functional laminate 1 in all figures may be manufactured using a method comprising the steps of:
- providing at least one patchwork layer 2, 2', 3, 3';
- stacking the patchwork layer 2, 2', 3, 3' with at least one other layer 2, 2', 3, 3' in order to obtain a stack of layers 2, 2', 3, 3', wherein at least one proximate layer 2, 2', 3, 3' directly adjacent to the patchwork layer 2, 2', 3, 3' comprises at least one zone 2.1 to 2.$n$, 2'.1 to 2'.$n$, 3.1 to 3.$n$, 3'.1 to 3'.$n$ comprising the first material or the second material;
- laminating the stack of layers 2, 2', 3, 3' together by heat and/or pressure and/or gluing.

The patchwork layer 2, 2', 3, 3' may be produced by:
- creating at least one recess in one layer 2, 2', 3, 3' essentially consisting of one of the first or second material;
- at least partially filling at least one of said recesses with a patch at least comprising the other of the first or second material.

The first material may be harder than the second material. For example the first material may be PC, PET or PET-G and the second material may be an elastomer, as for example PU, or even preferably a thermoplastic elastomer (TPE) like TPU. In the present document the designation of first and second material may always be exchanged. The single limitation is that the smoother material should be in principle used to embed chip modules or similar elements inserted in the laminated body.

There may be more or less layers 2, 2', 3, 3' than shown in the figures, the number of patchwork layers and the number of non patchwork layers being variable, as their ordering in the stack of layers. The single restriction it that it should result in a localized uninterrupted bridge of one material between the two faces of the functional laminate 1.

The functional laminate 1 may be used as an inlay or a prelaminate for manufacturing a security document, such as a passport, an ID or a card.

LIST OF REFERENCES

1 functional laminate
2, 2' layer
2.1 to 2.$n$ zone, patch
3, 3' layer
3.1 to 3.$n$ zone, patch
4 chip module
5 antenna coil
6.1 to 6.$n$ auxiliary material

The invention claimed is:

1. A method for manufacturing a functional laminate, comprising:
   providing at least one core layer of a first material and creating a recess in the at least one core layer;
   a patch of a solid second material at least partially in the recess;
   positioning a chip or a chip module adjacently to the patch of solid second material;
   stacking the at least one core layer with at least one other layer of the first material in order to obtain a stack of layers, wherein the chip or chip module is positioned between the at least one other layer and the patch of solid second material; and
   laminating the stack of layers along with the patch of solid second material together by at least one of heat, pressure, and gluing.

2. The method according to claim 1, wherein during the step of laminating the stack of layers, the chip or chip module becomes embedded in the patch of solid second material.

3. The method according to claim 1, wherein the patch of solid second material is supported by a thin auxiliary material.

4. The method according to claim 1, wherein the recess is cut out by drilling.

5. The method according to claim 1, wherein at least one of the first material and the second material comprises a plastic material.

6. The method according to claim 1, further comprising forming a recess in the patch of solid second material before lamination, wherein the chip or chip module is at least partially positioned in the recess formed in the patch of solid second material before lamination.

7. The method according to claim 1, wherein the first material is at least one of a polycarbonate and a polyethylene terephthalate.

8. The method according to claim 7, wherein the second material comprises at least one of a polyurethane and thermoplastic polyurethane.

9. The method according to claim 1, further comprising utilizing the laminated stack of layers as at least one of an inlay and a prelaminate for manufacturing a security document.

* * * * *